(12) United States Patent
Reents et al.

(10) Patent No.: US 10,713,046 B2
(45) Date of Patent: Jul. 14, 2020

(54) SYSTEM MEMORY CONTROLLER WITH ATOMIC OPERATIONS

(71) Applicant: EXTEN Technologies, Inc., Austin, TX (US)

(72) Inventors: Daniel B. Reents, Dripping Springs, TX (US); Michael Enz, Fargo, ND (US); Ashwin Kamath, Cedar Park, TX (US)

(73) Assignee: EXTEN TECHNOLOGIES, INC., Austin, TX (US)

( * ) Notice: Subject to any disclaimer, the term of this patent is extended or adjusted under 35 U.S.C. 154(b) by 0 days.

(21) Appl. No.: 15/849,537

(22) Filed: Dec. 20, 2017

(65) Prior Publication Data
US 2019/0187984 A1 Jun. 20, 2019

(51) Int. Cl.
*G06F 9/30* (2018.01)
*G06F 12/0806* (2016.01)
*G06F 9/38* (2018.01)
*G06F 9/34* (2018.01)

(52) U.S. Cl.
CPC .............. *G06F 9/3004* (2013.01); *G06F 9/34* (2013.01); *G06F 9/3877* (2013.01); *G06F 12/0806* (2013.01)

(58) Field of Classification Search
None
See application file for complete search history.

(56) References Cited

U.S. PATENT DOCUMENTS

2009/0249026 A1* 10/2009 Smelyanskiy ...... G06F 9/30032
 712/4
2015/0324133 A1* 11/2015 Mittal ................... G06F 3/0655
 711/163

* cited by examiner

*Primary Examiner* — Jared I Rutz
*Assistant Examiner* — Marwan Ayash
(74) *Attorney, Agent, or Firm* — Sprinkle IP Law Group

(57) ABSTRACT

Methods and System for use on a memory controller are disclosed which provides atomic compute operations of any size using an asynchronous, pipelined message passing interface between clients and the memory controller.

21 Claims, 3 Drawing Sheets

SYSTEM MEMORY CONTROLLER WITH ATOMIC OPERATIONS

TECHNICAL FIELD

The subject disclosure relates generally to computer software and hardware design. In particular, the subject disclosure relates to system memory controller with atomic operations.

BACKGROUND

Typically, an embedded system memory controller services several clients each with a diverse set of data transfer patterns. For example, some clients will typically transfer large bursts of data (i.e., 4 KB) to/from memory thus representing the most efficient and highest bandwidth transfers. Other clients, such as the system management processor, will typically generate smaller data burst transfers in order to service its local cache memory. Still other clients, such as embedded processing nodes, will generate many smaller write/read operations to/from the system memory in order to manipulate small pieces of meta-data or state variables. These are typically RMW (Read Modify Write) sequences.

Nearly all processors have implemented atomic operations for allowing efficient synchronization primitives in symmetric multi-processor environments. However, these primitives tend to map to register sized (8 byte) operations that may be expressed with a single machine instruction for the processor. Standard implementations must flush all processor cores' caches to correctly implement atomic operations, which leads to a low number of expensive, high latency instructions.

Embedded applications using a systolic array of independent processors with message passing interfaces have a much different requirement for memory access. In this non-limiting example, a processor in a systolic array may request an atomic add of two integers. A standard implementation would implement an "atomic add" machine instruction. However, the systolic array is sharing access to a central memory controller with thousands of other cores. Blocking the processor while the transaction is in progress would be extremely detrimental to efficiency and scalability of the array.

In another non-limiting example, a client may want to "zero" a large range of system memory. Traditionally, this would require the client to physically transfer the complete "zero" data pattern from itself to the memory controller for subsequent writing to the physical memory. It is evident that the transfer of a long sequence of write data that consists of an all zeros pattern is quite inefficient and consumes client and client to memory controller interface bandwidth.

SUMMARY OF THE SUBJECT DISCLOSURE

The present subject disclosure presents exemplary methods and system memory controllers providing an asynchronous, message passing interface that supports atomic operations allowing offloads and performance optimizations for control firmware. The message passing interface allows a rich set of atomic operations that operate on a wide range of data lengths without modifying the instruction set of the processor.

In one exemplary embodiment, the present subject matter is a method for performing atomic operations in a system memory controller with an asynchronous, message passing interface. The method includes receiving a first message descriptor from a client; parsing the opcode, memory address, transaction length, and input data from the descriptor; locking a memory region defined by the address and length; reading stored data from a memory region; presenting the input data, stored data, opcode to a modification module; receiving a result from modification module; and sending a second descriptor to the client.

In another exemplary embodiment, the present subject matter is a method for performing atomic operations in a system memory controller. The method includes receiving a first descriptor from a client; parsing the opcode, memory address, transaction length, and input data from the descriptor; generating a memory read request; reading stored data from a memory module; presenting the input data, stored data, opcode to a modification module; receiving a result from modification module; generating a memory write request; forming a second descriptor; and sending the second descriptor to the client.

In yet another exemplary embodiment, the present subject matter is a system for performing atomic operations in a system memory controller. The system includes a client interface that receives a transaction request from a client; an access sequencer to decode the transaction request; a modification module that interacts directly with the access sequencer; a memory module that stores data; wherein the access sequencer decodes the transaction request and allows the data to be modified by the modification module before a result is sent back to the client.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Figure 1:
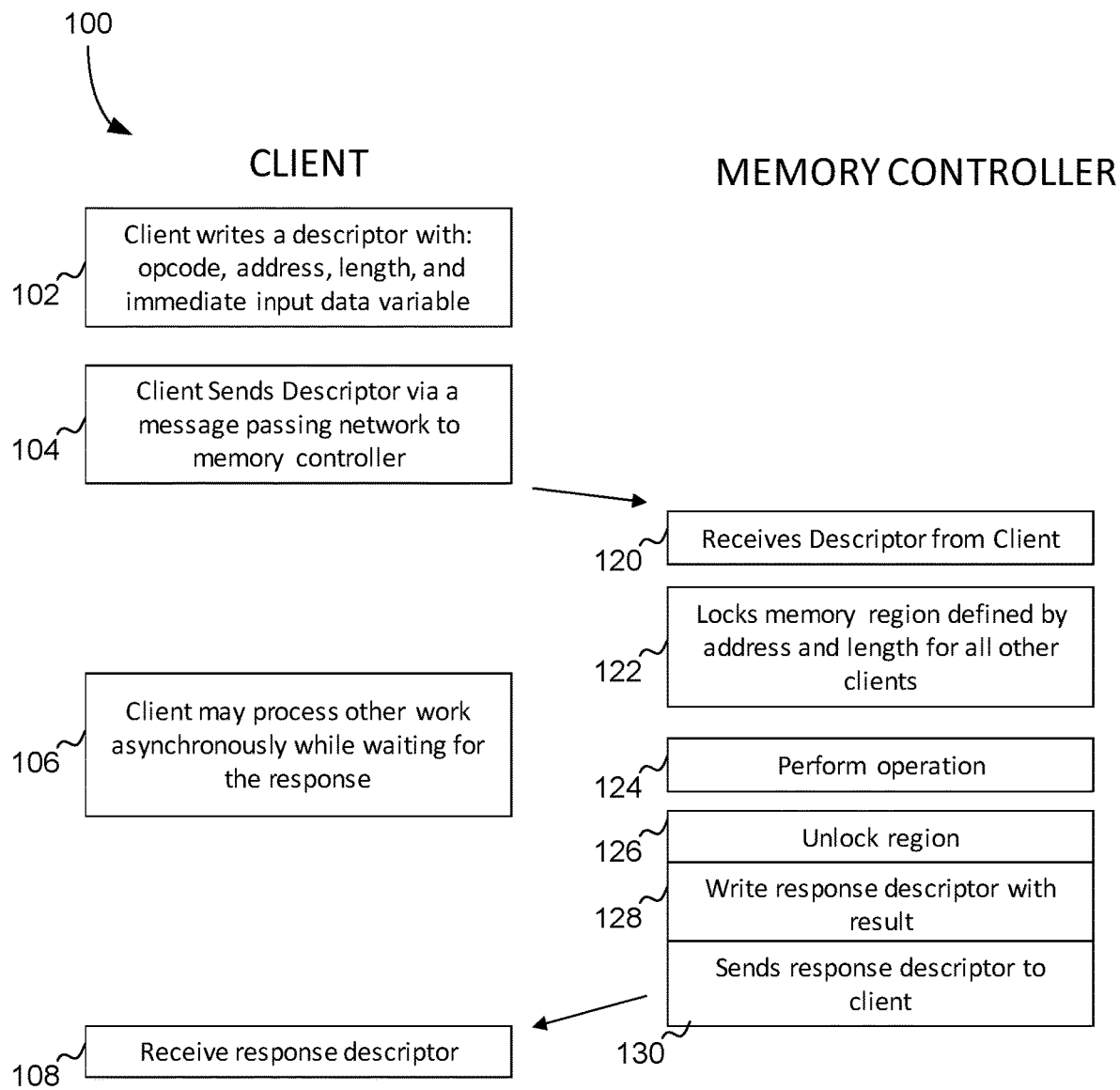
FIG. 1 illustrates a flow diagram detailing the client processor model for using asynchronous atomic offloads, according to an exemplary embodiment of the present subject disclosure.

According to the present subject disclosure, in a routine transaction, placing the atomic operations (i.e., offload operations) in the system memory controller allows all clients to utilize a common set of resources that are integral to the memory controller. The operations are not strictly for synchronization, but also provide efficient hardware offloads for common tasks and reduced message passing bandwidth when compared to simple read/write operations.

The atomic operation feature according to the present subject disclosure includes a number of novel features and capabilities including, but not limited to: (1) the descriptor passing mechanism is asynchronous and allows asynchronous completions and pipelined multiple requests to be in flight, thereby avoiding stalling the requesting processor during the atomic operation; (2) the descriptors and responses are passed as messages between processor cores and the memory controller, allowing scaling to a higher number of processor cores using an on-chip network for message routing; (3) the memory access descriptors that are formatted in the processor avoid changing the processor instruction set for each atomic operation; (4) the descriptor interface allows a rich and complicated set of operations that may interact with any size memory region (with some size restrictions depending on design/implementation specific details). Processor instruction sets are typically limited to register sized operations—like 8 to 32 bytes, while some of the hardware atomic operations being described in this disclosure may operate on kilobytes to megabytes of data depending on the specific design implementation.

The memory controller supports a set of clients that make memory transaction requests by forming and sending descriptors (or messages).

For write operations, the client is required to supply both the descriptor and the write data. The write data may be contained within the descriptor itself if it is small enough or may follow the descriptor. Depending on the specific application, the memory controller can return a response to the client when the write operation is completed. The response takes the form of a descriptor and may or may not have some unique status information within.

For read operations, the client supplies a descriptor only. Read operations will always cause the memory controller to send a response to the requesting client. Small data requests may include the data in the response descriptor while larger requests will return a message with the descriptor followed by the data.

For atomic operations, the client supplies a descriptor to the memory controller and possibly some variable data. The descriptor contains all of the information necessary for the memory controller to complete its task. Based on the specific operation requested, the memory controller may or may not generate a response descriptor. A response data phase will conditionally be generated for these atomic operations. Generally speaking atomic operations work on relatively small quantities of data but this is really only limited by the way that the descriptor is defined in the specific implementation and is not a limitation of the subject disclosure itself.

The descriptors typically contain the following fields: opcode (defines the operation type and response type, if any); memory address (byte address if any alignment is supported); data transfer length (in bytes if any resolution is supported/limited by some opcodes based on specific implementations); immediate data/data mask (quantity limited by the specific implementation); and return status.

When the memory controller receives a descriptor that is requesting an atomic operation it will perform the entire sequence until complete. The memory controller is responsible for ensuring atomic memory access. This means the full operation is completed without allowing access to the same memory region to another client. The memory controller may interleave operations to non-overlapping memory regions in the memory address space for efficiency, but it must serialize access to any given memory region. As an example, assume two clients both try to add 1 to memory location X with initial value 0. Atomicity ensures the final value at location X is 2. Without atomicity, both clients may first read 0 from location X and both clients may try to write 1. The sequence typically consist of the following operations: read data from the memory address given; perform computations using the data returned from memory and the data supplied by the client via the descriptor; conditionally write back the computation results to the given memory address; and conditionally generate a response descriptor back to client which contains any status specific to the operation and conditionally, the original data that was read from memory.

Some examples of useful atomic operations include, but are not limited to: write new data/return old data; write all zeros; write immediate with bit mask; write immediate with byte mask; write immediate data < > memory read data, where < >=bitwise AND, OR, or XOR; write sum of immediate data and memory read data; compare immediate data with memory read data; compare immediate data with memory read data and exchange if not equal. Other operations are also possible and within the scope of the present subject disclosure.

FIG. 1 illustrates an exemplary client and memory controller interaction 100 for atomic operations. The client formats a descriptor, at step 102, The client writes the descriptor with, for example, opcode, address, length, and immediate input data available. The client then sends, at step 104, the descriptor to the memory controller (MC). This is asynchronous, so the client may continue processing other data, including pipelining additional MC requests, as shown in component 106. The MC receives the request from the client, at step 120, and locks the memory region defined by the memory address and length for all other clients, at step 122. This ensures that any read, modify, and write portions of the operation occur as an atomic unit. Other clients may not perform atomic operations on this region simultaneously. However, the MC may be processing multiple operations on different memory regions in parallel. The MC performs the operation at step 124. Once completed, the memory controller unlocks the memory region at step 126, writes a response descriptor with results at step 128, and sends the response descriptor back to the client at step 130. The Client then receives the response descriptor at step 108.

Figure 2:
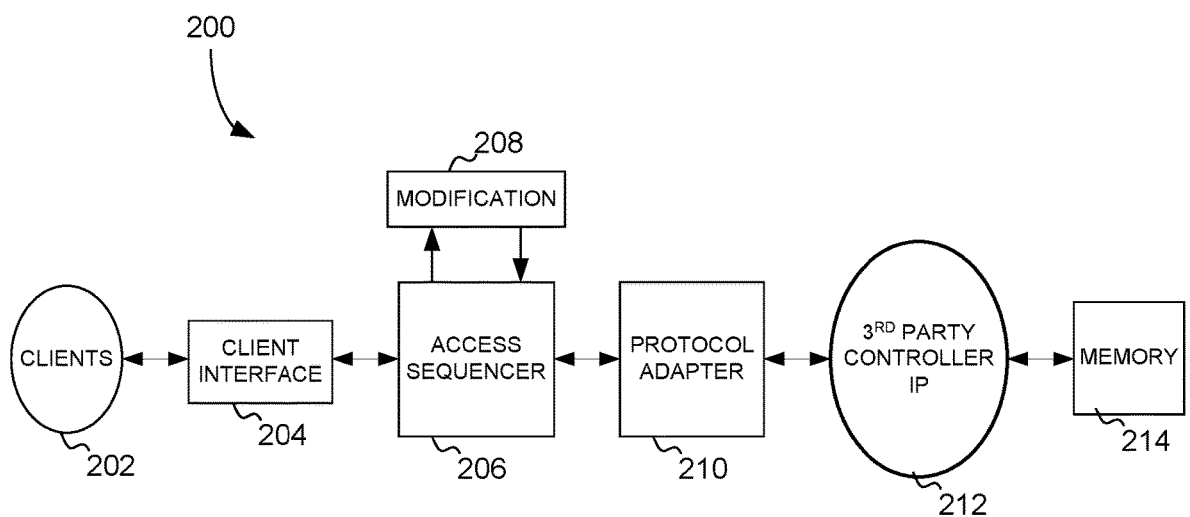
FIG. 2 illustrates a block diagram showing a transaction path, according to an exemplary embodiment of the present subject disclosure.

An exemplary embodiment of the memory controller subject disclosure is shown in FIG. 2. Each block is briefly described as follows. An exemplary method and system 200 includes a client Interface 204 which accepts requests (i.e., descriptors and possibly write data) for memory transactions from a configurable number of clients 202. A typical round robin arbitration scheme may be employed to select a given client request and the multiplexing and decode logic may be employed to steer the selected client transaction request and response to/from the access sequencer 206.

The access sequencer 206 is responsible for decoding the selected descriptor from a given client 202 and for performing all memory transactions between the client 202 and the protocol adapter 210. This includes the performance of all data alignment operations. This module 206 also has a modification block interface 208. When servicing an atomic operation request, the sequencer 206 will perform read operations from memory 214, direct the read data to the modification block 208, and direct the incoming write data from the client 202 to the modification block 208. The actual atomic operations are performed in the modification block 208. The results are then given back to the sequencer 206 in order to complete the data write back to memory (conditionally) 214 and/or generate the response back to the requesting client 202.

The modification block 208 is where the atomic operations take place. The sequencer 206 is responsible for presenting read data from memory, write data, operation specific attributes, and the opcode value from the client 206. Given this information, the modification block 208 performs the specific operation using the input data streams and then presents its results and status information back to the sequencer 206. The sequencer 206 is then responsible for taking the appropriate action which may include writing modified data back to the memory 214 and/or generating specific responses back to the client 202.

The protocol adapter block 210 is responsible for allowing the access sequencer 206 to work with any 3rd party controller IP bus protocol 212.

Figure 3:
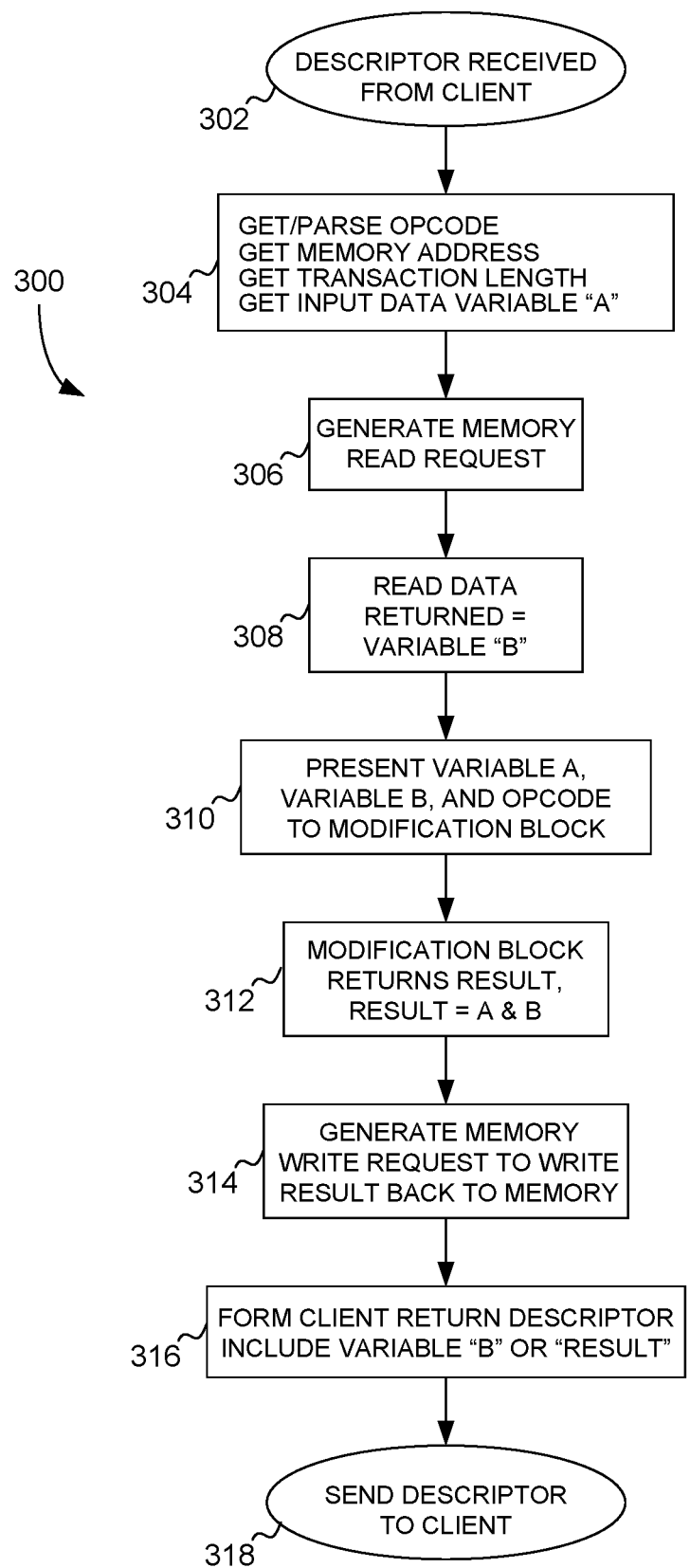
FIG. 3 illustrates a flow diagram detailing the sequence of events performed by the memory controller upon the reception of a bit-wise AND atomic operation, according to an exemplary embodiment of the present subject disclosure.

FIG. 3 illustrates an exemplary embodiment of the present subject disclosure presented as a flow diagram sequence of events performed by the memory controller upon the reception of a bit-wise AND atomic operation. In an initial step 302, a descriptor is received from a client through a client interface. Upon receipt, at step 304, the access sequencer deconstructs the descriptor to get/parse the opcode, to get the memory address, to get a transaction length, and get input data variable "A." Next, at step 306, the access sequencer generates a memory read request and forwards it to the memory. At step 308, the data returned from the memory is read as variable "B." At step 310, the access sequencer then presents variable A, variable B, and OP code to the modification block. Step 312 comprises of the modification block returning a result, which is a combination of variables A and B. The access sequencer, at step 314, then generates a memory write request to write the result back to memory. Further, at step 316, the access sequencer forms a client return descriptor which includes variable "B" or the result. Step 318 involves the descriptor being sent to the client. Although this exemplary embodiment was shown with a particular series of steps, other variations are also possible and within the scope of the present disclosure.

The subject matter described herein may be used in a variety of preferred ways, including, for example, generation of a module level description defining the types of atomic operation and clients to be supported; low level, micro-architecture document showing block level flow diagrams for the implementation; generation of Verilog RTL to implement the design; block level simulation to verify the design and modify any issues found; integration into the top level design; system level simulation; and standard back-end ASIC development process to produce the targeted device. Other variations are also possible.

Alternate uses of the subject disclosure are also within the scope of the present disclosure. For example, the micro architecture and implementation specific details have been defined in such a way as to allow additional atomic operations, client interfaces, data steering options, etc. to be added quickly and without interface protocol changes. The present specific design is not directly dependent on any other 3rd party IP hardware blocks from a protocol or data bus width perspective.

The examples and methods described above are not limited to software or hardware, but may be either or a combination of both. If software, the method described is presented as code in a software program. If hardware, a processor is used to conduct the steps which are embedded within the hardware. The subject matter may also be a combination of software and hardware with one or more steps being embedded within a hardware component, and the other steps being part of a software program.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A system memory controller for performing an atomic operation on a memory of a computing system, comprising:
   an interface to a message passing network within the computing system, the message passing network coupling one or more processor cores within the computing system to the system memory controller and adapted to receive a descriptor from a first processor core, the descriptor including an opcode, memory address and transaction length wherein the opcode defines an atomic memory operation of a plurality of atomic memory operations and wherein the first processor core does not block after sending the descriptor;
   an access sequencer block including logic for:
      decoding the descriptor received through the interface by parsing the descriptor to determine the opcode, memory address and transaction length,
      locking a memory region of a memory of the computing system coupled to the system memory controller, the memory region defined by the address and transaction length and
      reading data from the memory region of the computing system if the atomic operation is associated with a memory read operation,
      providing the opcode, data, memory address and transaction length to a modification block,
      receiving a result from the modification block,
      conditionally writing the received result to the locked memory region,
      generating a return descriptor including the result received from the modification block, and
      sending the return descriptor to the first processor core over the message passing network; and
   the modification block including logic for performing the atomic memory operation of the plurality of atomic memory operations defined by the opcode of the descriptor using the data provided by the access sequencer to generate the result of the atomic operation, and providing the result to the access sequencer block.

2. The system of claim 1, wherein the system memory controller further comprises a protocol adapter block comprising logic to interface between the sequencer and a non-native IP controller.

3. The system of claim 1, wherein the first processor core has a register size and the transaction length is greater or smaller than the register size.

4. The system of claim 1, wherein the opcode is not a part of the instruction set of the first processor core.

5. The system of claim 1, wherein the first processor core has a cache.

6. The system of claim 1, wherein the first processor core is part of a systolic array.

7. The system of claim 1, wherein the result includes stored data.

8. A method for performing an atomic operation on a memory of a computing system using a system memory controller, comprising:
   at a system memory controller of a computing system:
      receiving a descriptor at the system memory controller, where the descriptor was received at an interface to a message passing network within the computing system, the message passing network coupling one or more processor cores within the computing system to the system memory controller and adapted to receive the descriptor from a first processor core, the descriptor including an opcode, memory address and transaction length, wherein the opcode defines an atomic memory operation of a plurality of atomic memory operations and wherein the first processor core does not block after sending the descriptor;

providing the descriptor to an access sequencer block, the access sequencer block:

decoding the descriptor received through the interface by parsing the descriptor to determine the opcode, memory address and transaction length, locking a memory region of a memory of the computing system coupled to the system memory controller, the memory region defined by the address and transaction length and reading data from the memory region of the computing system if the atomic operation is associated with a memory read operation, providing the opcode, data, memory address and transaction length to a modification block, receiving a result from the modification block, conditionally writing the received result to the locked memory region, generating a return descriptor including the result received from the modification block, and sending the return descriptor to the first processor core over the message passing network; and performing, by the modification block, the atomic memory operation of the plurality of atomic memory operations defined by the opcode of the descriptor using the data provided by the access sequencer to generate the result of the atomic operation, and providing the result to the access sequencer block.

9. The method of claim 8, wherein the system memory controller further comprises a protocol adapter block adapted to interface between the sequencer and a non-native IP controller.

10. The method of claim 8, wherein the first processor core has a register size and the transaction length is greater or smaller than the register size.

11. The method of claim 8, wherein the opcode is not a part of the instruction set of the first processor core.

12. The method of claim 8, wherein the first processor core has a cache.

13. The method of claim 8, wherein the first processor core is part of a systolic array.

14. The method of claim 8, wherein the result includes stored data.

15. A non-transitory computer readable medium for performing an atomic operation on a memory of a computing system using a system memory controller, comprising instructions for:

at a system memory controller of a computing system:

receiving a descriptor at the system memory controller, where the descriptor was received at an interface to a message passing network within the computing system, the message passing network coupling one or more processor cores within the computing system to the system memory controller and adapted to receive the descriptor from a first processor core, the descriptor including an opcode, memory address and transaction length, wherein the opcode defines an atomic memory operation of a plurality of atomic memory operations and wherein the first processor core does not block after sending the descriptor;

providing the descriptor to an access sequencer, the access sequencer block:

decoding the descriptor received through the interface by parsing the descriptor to determine the opcode, memory address and transaction length, locking a memory region of a memory of the computing system coupled to the system memory controller, the memory region defined by the address and transaction length and reading data from the memory region of the computing system if the atomic operation is associated with a memory read operation, providing the opcode, data, memory address and transaction length to a modification block, receiving a result from the modification block, conditionally writing the received result to the locked memory region, generating a return descriptor including the result received from the modification block, and sending the return descriptor to the first processor core over the message passing network; and performing, by the modification block, the atomic memory operation of the plurality of atomic memory operations defined by the opcode of the descriptor using the data provided by the access sequencer to generate the result of the atomic operation, and providing the result to the access sequencer block.

16. The non-transitory computer readable medium of claim 15, wherein the system memory controller further comprises a protocol adapter block adapted to interface between the sequencer and a non-native IP controller.

17. The non-transitory computer readable medium of claim 15, wherein the first processor core has a register size and the transaction length is greater or smaller than the register size.

18. The non-transitory computer readable medium of claim 15, wherein the opcode is not a part of the instruction set of the first processor core.

19. The non-transitory computer readable medium of claim 15, wherein the first processor core has a cache.

20. The non-transitory computer readable medium of claim 15, wherein the first processor core is part of a systolic array.

21. The non-transitory computer readable medium of claim 15, wherein the result includes stored data.

* * * * *